A. E. BUCHENBERG.
ELECTRIC WELDING MACHINE.
APPLICATION FILED SEPT. 25, 1909.

959,305.

Patented May 24, 1910.

2 SHEETS—SHEET 1.

WITNESSES:
D. C. Walter
C. H. Bills

INVENTOR.
Alvin E. Buchenberg,
By Owen & Owen,
His attys

A. E. BUCHENBERG.
ELECTRIC WELDING MACHINE.
APPLICATION FILED SEPT. 25, 1909.
959,305.
Patented May 24, 1910.
2 SHEETS—SHEET 2.
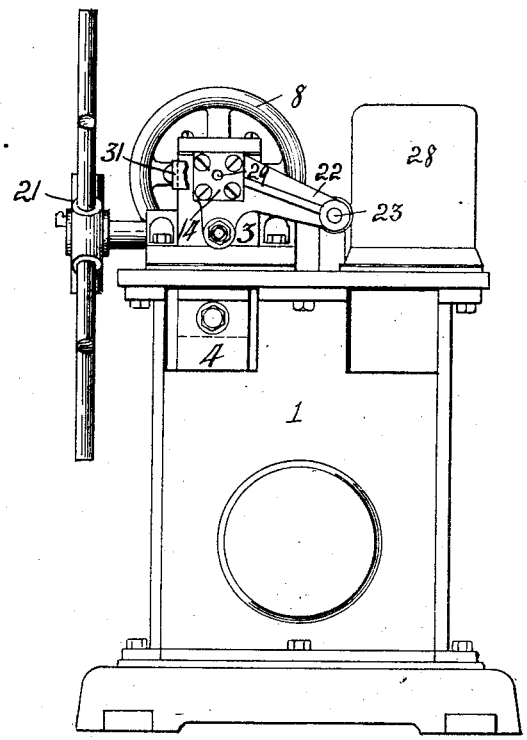
Fig. 3.
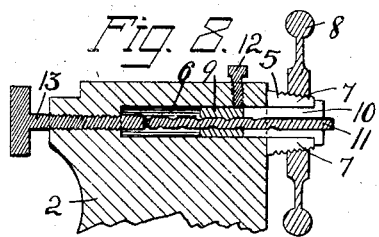 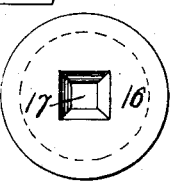 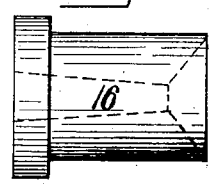
Fig. 8. Fig. 4. Fig. 5.
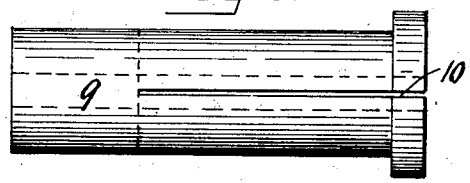 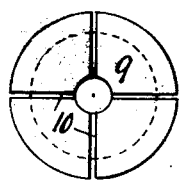
Fig. 6. Fig. 7.
WITNESSES:
D. C. Walter
C. H. Bills
INVENTOR.
Alvin E. Buchenberg.
By Owen & Owen,
His attys.

UNITED STATES PATENT OFFICE.

ALVIN E. BUCHENBERG, OF TOLEDO, OHIO, ASSIGNOR, BY MESNE ASSIGNMENTS, TO THE TOLEDO ELECTRIC WELDER COMPANY, OF TOLEDO, OHIO, A CORPORATION OF OHIO.

ELECTRIC WELDING-MACHINE.

959,305.   Specification of Letters Patent.   Patented May 24, 1910.

Application filed September 25, 1909. Serial No. 519,619.

*To all whom it may concern:*

Be it known that I, ALVIN E. BUCHENBERG, a citizen of the United States, and a resident of Toledo, in the county of Lucas and State of Ohio, have invented a certain new and useful Electric Welding-Machine; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.
My invention relates to metal-working apparatus of the class in which the metal is heated to the desired state by the passage of an electric current therethrough, and is then welded, upset or otherwise operated upon.
The object of my invention is the provision of an apparatus of this class, which is particularly adapted for the welding of drill blades to their shanks, but may be used for other purposes, and which is simple, efficient and rapid in its operation.

The operation, construction and arrangement of the parts of the invention are fully described in the following specification, and while in its broader aspect it is susceptible of numerous embodiments, a preferred form of the same is illustrated in the accompanying drawings, in which,—

Figure 1:
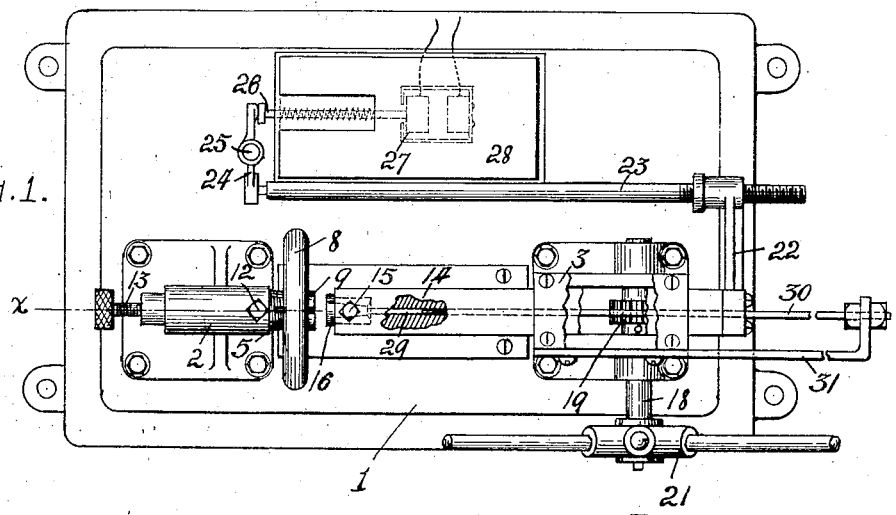
Figure 2:
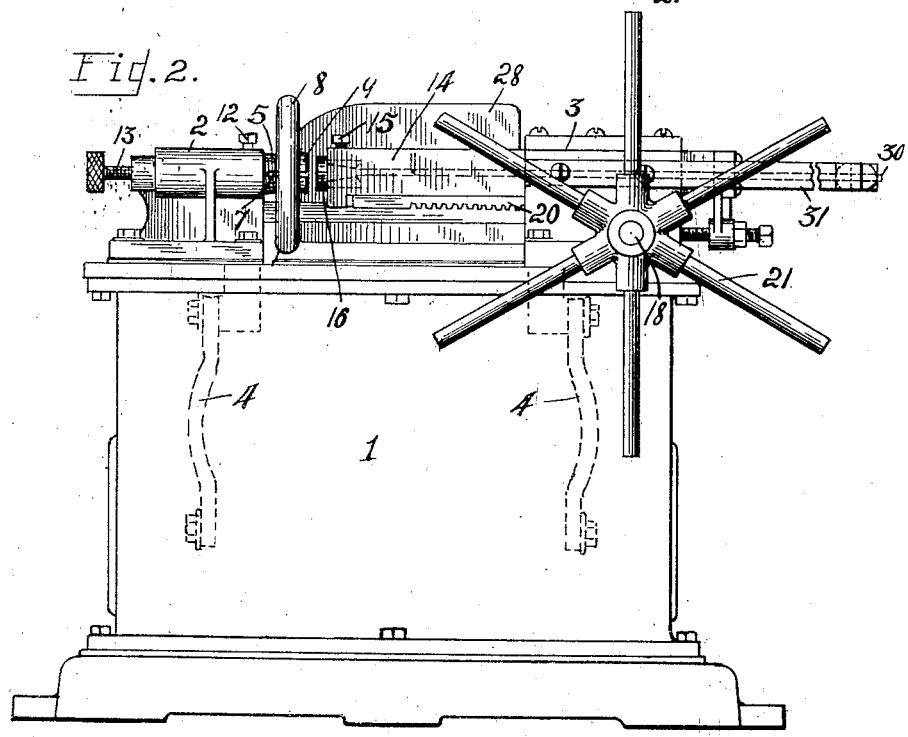

Figure 1 is a plan of the machine embodying my invention with portions broken away.
Fig. 2 is a side elevation of the same. Fig. 3 is an end view thereof with a portion broken away. Figs. 4 and 5 are enlarged details of the shank-holder. Figs. 6 and 7 are similar views of the blade-chuck or holder, and Fig. 8 is a slightly enlarged section on the line *x* in Fig. 1 with a drill-blade in position therein.

Referring to the drawings, 1 designates the base or frame of the machine, on the top of which near the opposite ends thereof are bolted or otherwise suitably secured, the standards 2 and 3, as shown. These standards are electrically connected to the secondary of a transformer (not shown) through leads 4, 4 in Fig. 2.

The standard 2 is formed on its inner face near its top with a horizontally-projecting tapered boss 5 having an axial socket or bore 6 therein, which continues back into the standard as shown in Fig. 8. The boss 5 is longitudinally split as at 7 and has a hand-wheel 8 threaded on its tapered surface, whereby to adapt a turning of such wheel thereon to effect a contraction of the outer end of the boss to grip an article fitted within the socket 6.

A bushing or chuck 9 fits within the socket 6 and is provided at its outer end with a series of longitudinal slots 10 to adapt it to coöperate with the boss 5 to hold the drill-blade or work 11 when the fingers of such boss are contracted. A set screw 12 secures the chuck 9 within the standard. The movement of the work within the chuck is limited by contact with an adjustable stop or screw 13, which is threaded into the standard with its inner end projecting longitudinally into the inner end of the socket 6.

Working through the standard 3 by which it is suitably guided is a horizontally-disposed longitudinally-movable arm or bar 14, which is in line with the work-holding chuck 9 and is adapted to have its movements toward and away from the same. Fitted into a socket in the inner end of the arm or bar 14 and secured therein by a set screw 15 is a holder 16 for the shank or part of the work to be welded to the blade or part 11 of the work which is held by the chuck 9. The socket 17 of this holder registers with the socket 6 in the standard 2 and is shaped to suit the work to be held thereby.

A shaft 18 is journaled in the standard 3 beneath the arm or bar 14, transversely thereof, and carries a pinion 19 within the standard for meshing with a rack 20 on the under side of the bar 14, whereby a longitudinal movement is imparted to such bar by a turning of the pinion. A spider-wheel 21 is mounted on the forward end of the shaft 18 for operating the same.

Projecting rearwardly from the outer end of the arm or bar 14 is an arm 22 through the outer end of which is threaded one end of a rod 23. This rod is adapted to have its free end move into contact with and oscillate a lever 24 when the bar 14 has reached a predetermined point in its forward or welding movement. The lever 24 is carried by a vertical pivot 25 and when oscillated by the rod 23 effects an inward movement of the rod 26 and opens the switch 27 in circuit with the transformer of the machine, one terminal of such switch being carried by the rod 26, thus automatically shutting off the welding current at a predetermined stage of the welding operation. The switch 27 is shown as being incased within a housing 28 and may be of any suitable construction, the same being only diagrammatically shown in the drawings.

For the purpose of automatically ejecting the work from the holder 16 on a retracting or outward movement of the arm or bar 14, such arm has a longitudinal bore 29 therethrough in register with the socket in the holder 16 and in which works an ejecting-rod 30. This rod has its outer end fixed to the laterally angled end of an arm 31, which projects outwardly from the standard 3, and has its inner end projected a suitable distance within the bar 14 to engage and eject the work from the holder 16 at a predetermined point in a retracting movement thereof.

In the use of my apparatus, the operator inserts a blade of the drill or other work into the chuck 9 and secures it therein by a turning of the hand-wheel 8 on the tapered boss 5 to effect a contraction of the split end of such boss and the split end of the chuck 9, and also inserts a drill-shank or other part of the work into the holder 16. This being done the spider-wheel 21 is turned to communicate an inward movement to the arm or bar 14 through the medium of the pinion 19 and rack 20 and to effect a consequent movement of the work carried by holder 16 into contact with the piece of work to which it is to be welded. The pieces of work when in contact close the secondary circuit of the transformer due to their electrical connection with the leads 4, 4 through their respective carrying parts, thus permitting a welding current to flow therefrom. When the arm 14 has reached a predetermined point in its advance, the welding operation is automatically stopped by reason of the rod 23 striking and oscillating the lever 24 to open the switch 27. The work having been released from the chuck 9 by an outward turning of the hand-wheel 8, the spider 21 is turned to retract the arm 14, which carries the work therewith. At a predetermined point in such retracting movement, the work strikes and is ejected from the holder 16 by the ejector rod 30.

I wish it understood that my invention is not limited to any specific construction and arrangement of the parts except in so far as limitations are specified in the claims.

Having thus described my invention, what I claim as new and desire to secure by Letters Patent, is,—

1. In an electric metal-working apparatus, the combination with a work-holder, of a current-conducting member movable toward and away from the work-holder and having a socket in its inner end, a work-holder removably carried within such socket, and means for moving said member.

2. In an apparatus of the class described, the combination with an electrically conductive work-holder, of an electrically conductive member movable toward and away from said work-holder and having a socket in the inner end thereof and opening toward said work-holder, a socketed work-holding part removably fitted into the member socket, and means for imparting reciprocatory movements to said member.

3. In an apparatus of the class described, the combination with a stationary work-holder, of a member longitudinally movable toward and away from said work-holder, said member having a hole longitudinally therethrough which terminates at its inner end in a socket, a socketed work-holding part removably mounted in said socket and having its socket opening into said hole, a fixed ejector rod working in said hole and operative to eject work from said part at a predetermined point in the retracting movements of said member, and means for moving said member.

4. In an electric metal-working apparatus, a standard having a tapered boss projecting therefrom which is axially bored and longitudinally split, a chuck fitted into such socket and having its outer end split to adapt it to coöperate with the split end of such boss to grip work therein, means fitted onto such boss and movable to effect a contraction of its outer end, a member movable toward and away from said boss and having a work-holding socket in its inner end, and means for imparting reciprocatory movements to such member.

5. In an electric metal-working apparatus, two relatively fixed spaced standards, a work-holding chuck carried by one standard and a reciprocally movable arm carried by the other standard and having a removable socketed work-holding part in its inner end and in register with such chuck, and means for moving such arm toward and away from said chuck.

6. In an electric metal-working apparatus, the combination of two relatively fixed spaced standards, a work-holding chuck carried by one standard, means coöperating with such chuck to grip the work, a bar guided by the other standard for reciprocatory movements toward and away from such chuck, a work-holder removably carried by said bar at its inner end, means for effecting reciprocatory movements of such bar, and means operative at a predetermined point in a retracting movement of such bar to eject work from said work-holder.

7. In an electric metal-working apparatus, the combination of a standard having a tapered boss projecting therefrom, said boss being axially socketed and longitudinally split and said socket extending within said standard, a chuck fitted within said socket and having its outer end split, an adjustable stop carried by said standard and projecting into the inner end of said socket to serve as a work gage, a wheel threaded to such boss to coöperate with said boss and chuck to grip work inserted within the latter, a second standard spaced from said first standard, a bar carried by said second standard for horizontal reciprocatory movements toward and away from said chuck and having a socketed work-holding bar, means for moving such bar and means fixed relative to said bar and operative to eject work therefrom at a predetermined point in a retracting movement thereof.

In testimony whereof, I have hereunto signed my name to this specification in the presence of two subscribing witnesses.

ALVIN E. BUCHENBERG.

Witnesses:
C. W. OWEN,
EMILLE SCHRIEBER.